Feb. 20, 1951 C. B. McBRIDE 2,542,549
APPARATUS FOR SEPARATING SUSPENDED PARTICLES FROM GASES
Filed July 17, 1948 5 Sheets-Sheet 1
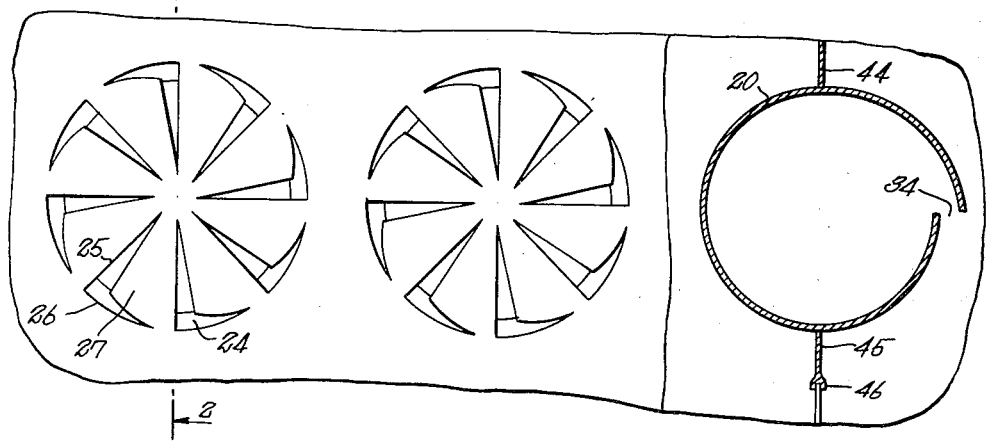
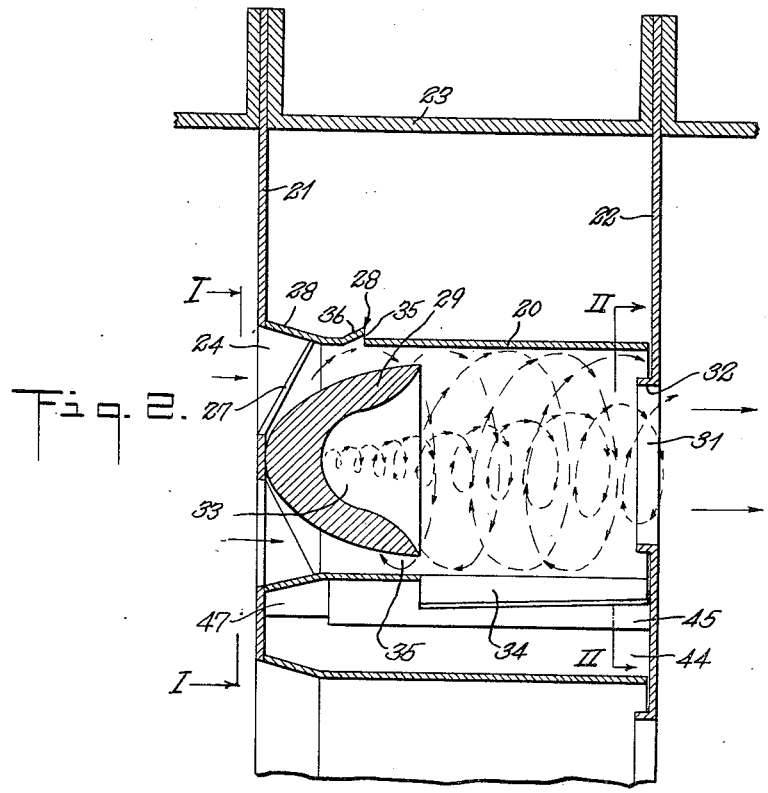
INVENTOR.
CHARLES B. McBRIDE
BY
Benj. T. Rauber
ATTORNEY INVENTOR.
CHARLES B. McBRIDE
BY
Benj. T. Rauber
ATTORNEY

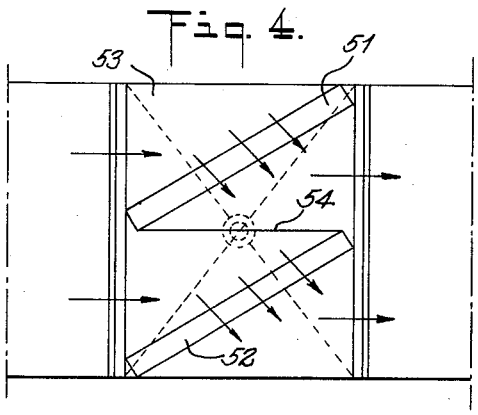
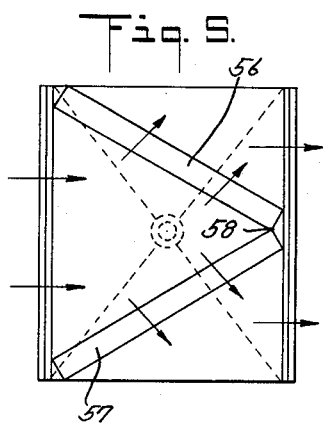
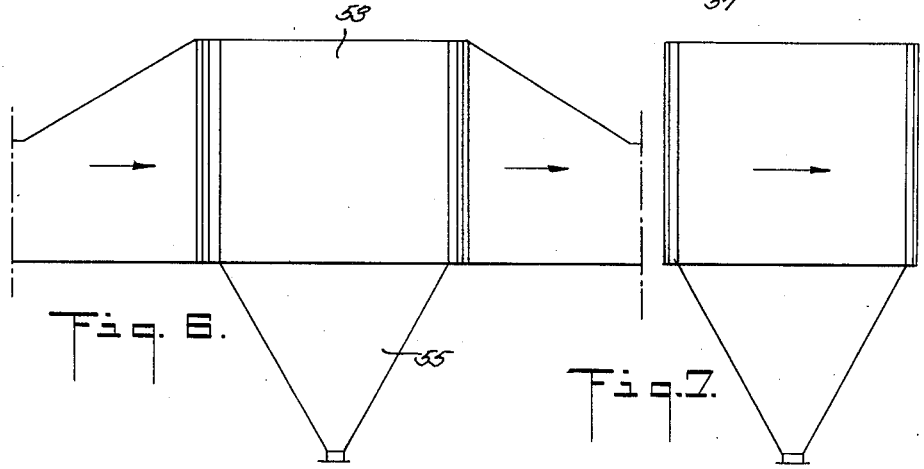
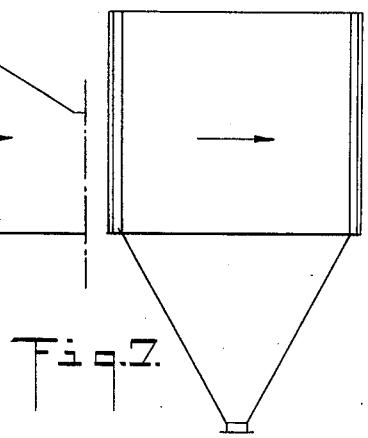
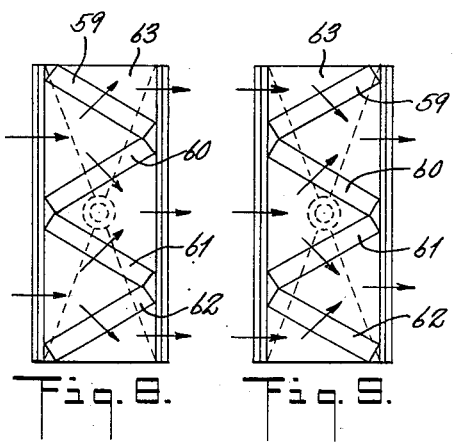
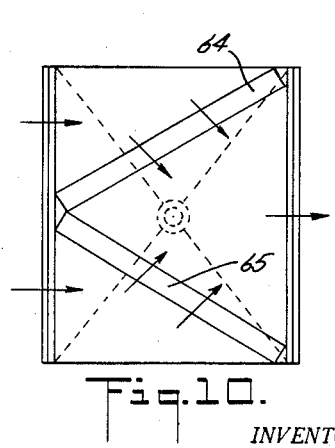

Feb. 20, 1951     C. B. McBRIDE     2,542,549
APPARATUS FOR SEPARATING SUSPENDED PARTICLES FROM GASES
Filed July 17, 1948     5 Sheets-Sheet 4
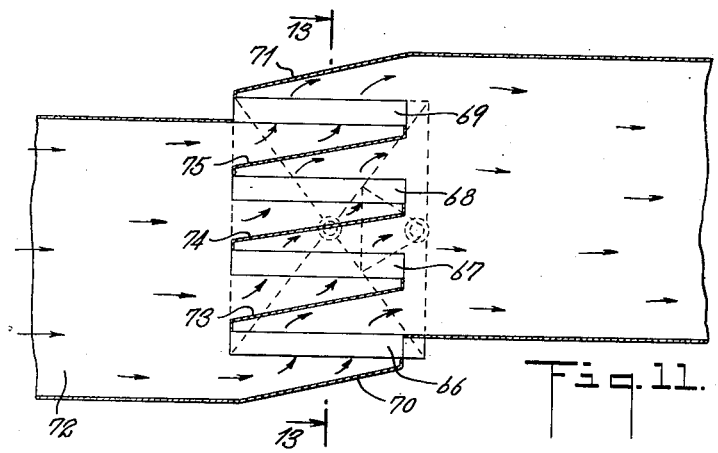
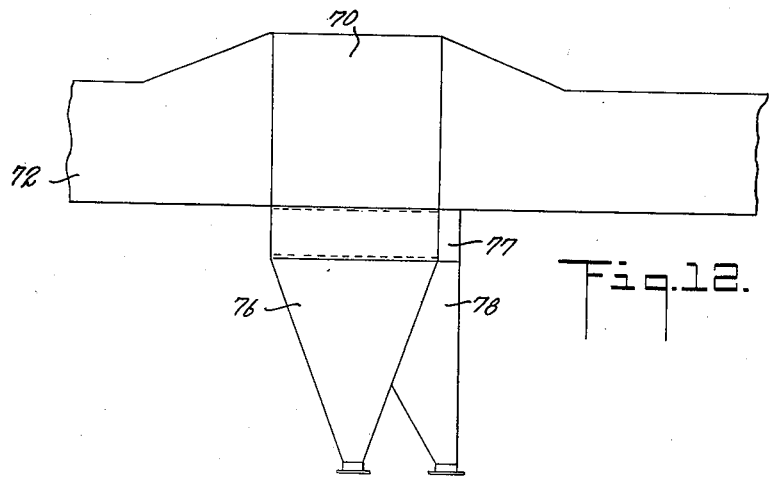
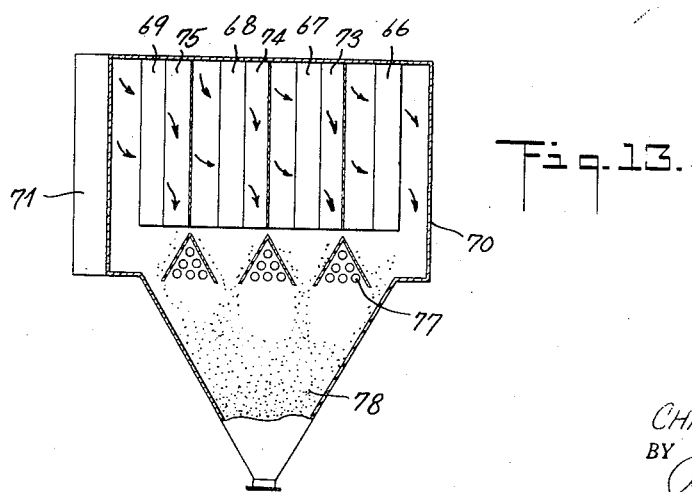
INVENTOR.
CHARLES B. McBRIDE
BY
Benj. T. Rauber
ATTORNEY Feb. 20, 1951 — C. B. McBRIDE — 2,542,549
APPARATUS FOR SEPARATING SUSPENDED PARTICLES FROM GASES
Filed July 17, 1948 — 5 Sheets-Sheet 5

INVENTOR.
CHARLES B. McBRIDE
BY
Benj. T. Rauber
ATTORNEY

Patented Feb. 20, 1951

2,542,549

UNITED STATES PATENT OFFICE 2,542,549

APPARATUS FOR SEPARATING SUSPENDED PARTICLES FROM GASES

Charles B. McBride, Port Chester, N. Y., assignor to The Thermix Corporation, Greenwich, Conn., a corporation of Connecticut Application July 17, 1948, Serial No. 39,338

17 Claims. (Cl. 183—80)

My present invention relates to a method and apparatus for separating suspended particles from gases such as air, flue gases or metallurgical fumes.

Heretofore suspended particles have been separated centrifugally from air or gases by causing the air to pass in a helical path adjacent the wall of a separating tube or surface of revolution and then withdrawing it centrally in the opposite direction while the suspended particles thrown outwardly pass, without change of direction, to the opposite end of the tube or separator.

In my present invention, the gas, such as air, flue gas or other gases, are passed into one end of a tubular passage in a whirling stream which causes the suspended particles to be thrown outwardly against the inner surface of the tubular passage while the gases themselves pass through the opposite end of the passage without change of direction. The separated particles collecting on the inner surface of the passage and rotating thereabout pass outwardly through a slit or slot extending in a general longitudinal direction in the wall of the passage.

After passing through the slot the suspended particles fall into a dust bin or hopper. A small amount of the gases may be permitted to pass through the slot with the suspended particles in order to avoid or prevent the building up of pressure in the space about the tubes. This gas may be aspirated to the entry part of the tubular passage and re-passed through the separator to remove the suspended particles; or it may be passed through secondary tubes to remove suspended particles.

The effectiveness of separation of the particles from the gas in the separating tubes or tubular passages is increased by providing at the entrance end a flaring deflector which forms an annular passage adjacent the wall of the tubular passage thus bringing the suspended particles against the inner surface of the tube or passage and providing a space centrally of the passage into which the gases, after being freed from the particles, may flow before passing through the opposite end of the passage.

A number of tubes may be provided between spaced walls of a dust chamber thus enabling a large volume of gas to be divided into separate whirling or centrifugal streams. Balance between the several tubes or tubular passages is provided by suitable baffles. This arrangement of tubes is in multiple. A small amount of the gas withdrawn through the longitudinally extending slot with the separated particles may be aspirated to the inlet end of the tube and some may pass downwardly with the dust to the dust bin and be separated in the upper part of the latter by similar centrifugal tubes.

With the method and apparatus of this invention the gases from which the particles are to be separated may pass in a direct path thereby minimizing the pressure drop required through the apparatus and also greatly economizing in space. The apparatus may be combined with other separating apparatus, such as electrical precipitating apparatus, providing a uniform distribution of air to the latter. Also it may be used as a centrifugal separator for gases leaving an electric precipitator or collector in which the particles have been agglomerated.

The various features of the invention are illustrated, by way of example, in the accompanying drawings in which Fig. 1 is a front view in section on the lines I, II, of Fig. 2 of a separator embodying the invention;

Fig. 2 is a longitudinal section of a precipitator taken on line 2—2 of Fig. 1;

Figs. 4 and 5 are vertical sections, and Figs. 6 and 7 side elevations of various arrangements of separators in an air passage;

Figs. 8, 9 and 10 are plan views similar to that of Figs. 4 and 5 of still other arrangements of separators in an air passage;

Fig. 11 is a plan view; Fig. 12 a side elevation, and Fig. 13 a transverse section on line 13—13 of Fig. 11 of another modification of the invention;

Figure 3:
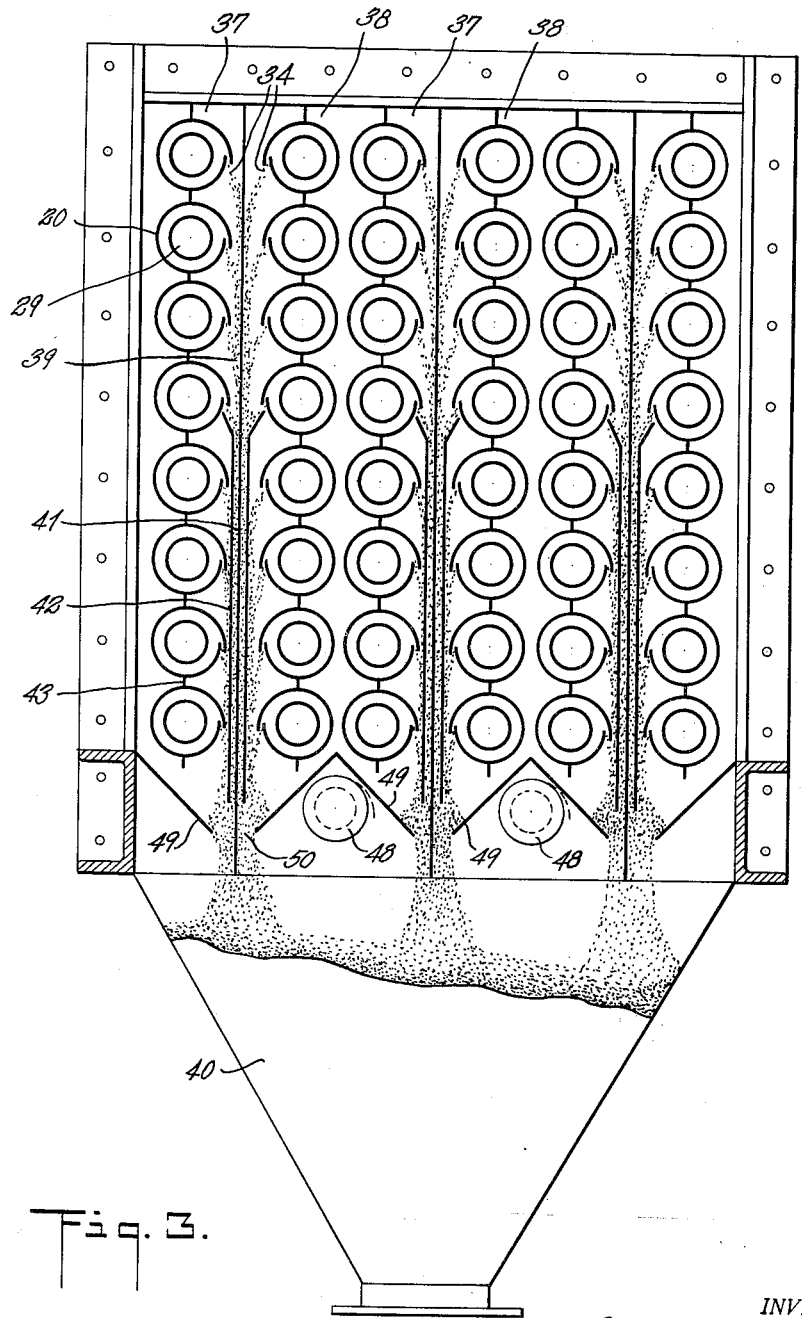
Fig. 3 is a vertical section taken on a plane in a direction transverse to the passage of the gases through a precipitator embodying the invention and having centrifugal tubes or passages arranged in vertical series.

In the embodiment of the invention as shown in Figs. 1 and 2, a number of centrifugal tubes 20 are provided between parallel walls 21 and 22 of a dust chamber. The outer space of the dust chamber between these walls may be closed by a spacing and enclosing wall 23. Dust laden gas passed through the centrifugal tubes enters through openings 24 in the wall 21 having deflectors that cause the gases to enter in a whirling or rotating manner. Any suitable form of openings may be provided for this purpose. Preferably the openings are provided by slitting or cutting the plate 21 radially along the lines 25 and circularly on the line 26 and bending the metal of the wall to form inclined areas 27, inclined for each tube in a single direction as, for example, clockwise or counterclockwise. In the example shown in Fig. 1 the direction of bending of the areas 27 is to provide a clockwise direction to the air entering the tubes 20. The tubes 20 may be flared slightly at 28.

The air is thus given a rotational movement by the deflecting areas 27 to provide a centrifugal force which causes the suspended dust particles to be thrown against the inner cylindrical surface of its tube 20. This rotational and centrifugal effect is accentuated by means of a deflector 29 which flares outwardly toward the walls of its respective tube and provides an annular passage 30 for the whirling gases. The deflector 29 also provides an inner space into which the gases flow away from the centrifugally deflected particles and from which they are withdrawn through an opening 31 in the wall 22, the opening 31 of each tube being centrally positioned or co-axial with each tube. The openings 31 are preferably of smaller diameter than that of the tubes 20 and are provided with an inwardly extending flange 32 to guard against any separated particles passing outwardly through openings 31. Preferably the deflector 20 is hollowed out to form a hollow space 33 to increase the tendency for air or gas to be drawn inwardly.

The separated particles thrown against the inner surface of the tube tend to rotate about the inner surface of the tube. To enable them to leave the tube a longitudinal slot 34 is provided in the wall of the tube. The wall of the tube at one side of the slot 34 is bent outwardly or offset from the other wall so that the outlet is in line with the path of the particles rotating about and against the inner wall of the tube.

The slot 34 may be slightly tapered in certain cases to compensate for a concentration of dust particles toward one end of the tube. This slot preferably extends from about the rear edge of the deflector 29 to substantially the opposite end of the tube. It extends in a general longitudinal direction but need not necessarily be in a linear direction parallel to the axis of the tube.

The rapid rotation of the air against the slot 34 tends to build up a pressure in the dust chamber about the tubes. This pressure may be reduced somewhat and the passage of the dust particles through the slot 34 facilitated by aspirating a small amount of gases from the dust chamber into the tube 20 in advance of the slot 34 and preferably into the annular space between the deflector 29 of the wall of the tube where the speed of the gases approaches its maximum with a consequent reduction in pressure or static head. This is accomplished by providing an arcuate cut 35, Fig. 2, through a part of the wall of the tube and bending the tube outwardly at as 36.

The tubes may be arranged in multiple in a chamber. Such an arrangement is illustrated in Fig. 3 in which tubes are arranged in a number of vertical series. In the example shown there are six series of 8-tubes but it will be understood that the number of tubes in a series and the number of series may be varied to suit different dimensional requirements. Preferably the tubes of each series provide for the same direction of rotation of the gases which may be opposite to the direction of an adjacent series so that both series direct the separate particles into a downwardly extending dust passage.

For example a series 37 provides for a clockwise rotation and an adjacent series 38 for a counterclockwise rotation with the slots 34 of each series delivering into a downwardly extending dust passage 39 through which the dust falls into a hopper 40. To restrict any tendency for crosswise currents of gases in the dust chamber vertical baffles 41 and 42 are provided in the passage 39 and the spaces between the tubes are spanned by connecting baffles 43. These baffles may be formed by diametrically opposite upper and lower ribs 44 and 45 which may have tongue and groove connections as shown at 46 to the next adjacent tube. To equalize the pressures on opposite sides of the baffles 43 the lower rib 45 may be made somewhat shorter than the upper rib to provide a communicating opening or passage 47 through which air or gas may pass from the slot 34 to the inlet 35.

Some air may be drawn also downwardly with the falling dust particles into the hopper 40 to promote the downward passage of the dust particles. This air is removed through one or more aspirating tubes 48 similar in construction to the tubes 20 and placed in the upper part of the dust hopper 40 or the lower part of the dust chamber beneath hopper sealing baffles 49 which span the space between the dust passages 39 leaving a small opening 50 for the downward passage of the dust stream. The sealing baffles 49 may be either gabled, as shown in Fig. 3, or squares or of any other configuration sufficient to receive the aspirating tubes.

Inasmuch as the dust particles are separated rapidly the tube 20 may be of a relatively short length as compared with the usual type of centrifugal tube and, accordingly, the walls 21 and 22 of the dust chamber may be quite closely spaced. This enables the dust chambers with a large number of tubes to be arranged compactly in a small space.

Various examples of such arrangements are shown in Figs. 4–13.

As shown in Fig. 4, two tube containing dust chambers 51 and 52 are provided in a flue or passageway 53, the dust chambers being arranged at an angle to the direction of flow of the gases, one end of each tube joining with a side wall of the passage 53, and the space between the opposite ends being spanned by a wall 54. The air from which the dust is to be separated passes through the tubes of the respective dust chambers in the direction shown by the arrows in Fig. 4.

A side view is shown in Fig. 6, the hopper for collecting the dust being indicated by the numeral 55. In Fig. 5, two dust chambers 56 and 57 are arranged in a V-formation with the separating ends close against the side walls of the chamber and converging to an apex 58 to close the space between the walls except through the tubes of the dust chamber.

In Figs. 8 and 9 a number of dust chambers 59, 60, 61 and 62 are arranged in zig-zag formation to span the space in a flue 63.

Fig. 10 shows an arrangement of dust chambers and collecting tubes 64 and 65 arranged in V-formation in reverse position to that of Fig. 5.

Fig. 11 shows a number of separating dust chambers 66, 67, 68 and 69 arranged in parallel lengthwise to the general direction of the movement of the gases. The walls 70 and 71 of the passage 72 converging toward the dust chamber 66 and 69 respectively and the spaces between the respective dust chambers being spanned by walls 73, 74 and 75 thereby forming for each dust chamber an inlet and outlet compartment in the passageway. The dust from the dust chamber 66—69 may be collected in a common hopper 76 which, as indicated in Fig. 13, may be provided with separating tubes 77 delivering into a hopper 78.

Figures 14, 15:
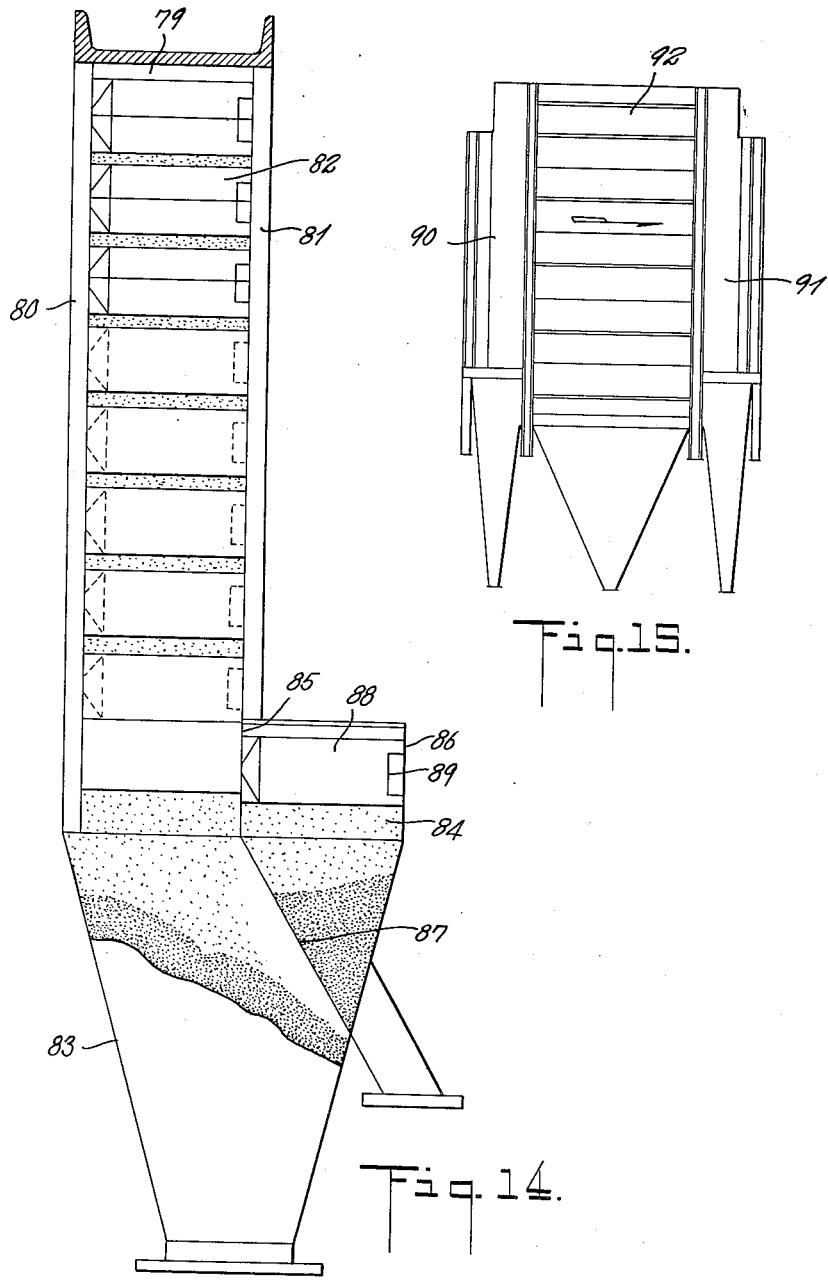
Fig. 14 is a vertical longitudinal section of another modification of the invention.
Fig. 15 is a diagrammatic side elevation showing the arrangement of centrifugal separating tubes of the invention with an electrical precipitator or concentrator.

The arrangement for accomplishing this secondary separation is also shown in Fig. 14. In this figure a dust chamber 79 formed between spaced walls 80 and 81 and provided with a number of separating tubes 82 delivers downwardly into a collecting hopper 83. In the upper end of the hopper 83 is a secondary dust chamber 84 between a continuation 85 of the wall 81 and a wall 86 spaced therefrom. The lower part of the dust chamber formed between the walls 85 and 86 is sealed from the hopper 83 by a separating inclined hopper wall 87. Separating tubes 88 similar to those of Figs. 1, 2 and 3 are provided between the walls 85 and 86 to receive dust laden gases from the lower end of the dust chamber 79 or the upper part of the hopper 83. The dust-free gases may pass through an outlet 89 to any suitable receiver or to the main air passage for dust-free gases.

As shown in Fig. 15 a pair of dust chambers 90 and 91 may be arranged on opposite sides of an electric precipitator 92. Air may be passed through the dust separating chamber 90 to remove the greater bulk of coarser particles and the partly or largely dust-free gases or air then pass into and through the electric precipitator 92. From the latter the gases or air pass through the dust separating chamber 91 in which particles agglomerated in the electric precipitator are efficiently separated.

Through the above invention I have provided a particle separator of simple, inexpensive, construction in which gases to be freed from suspended particles pass directly and with a minimum of change of direction through the centrifugal path required for the separation of the particles. As the path is short and direct a large number of tubes may be placed compactly. The dust-free air or gas is delivered from the centrifugal separating apparatus by flowing in substantially the same direction and with a uniform forward velocity throughout so that it may be received with advantage in an electric precipitator or other precipitator if further separation of particles is required. The compact arrangement of the tubes is of great advantage where apparatus is to be installed in a limited space, such as in power plants.

Having described my invention, what I claim is:

1. Apparatus for separating suspended particles from gases which comprises a dust chamber having spaced vertical walls, vertical series of centrifugal tubes spanning the space between said vertical walls, one of said walls having inlet openings to one end of said tubes and inclined thereto to give the entering air a whirling motion, the opposite wall having openings centrally of said tubes, each said tube having a flaring deflector at its entrance end to form a converging annular passage and having a longitudinal slot in its wall between said deflector and the opposite end of said tube and delivering into the space between said series of tubes, said space between said series of tubes forming a downwardly extending dust passage, a hopper below said dust chamber, sealing baffles between the dust passages and centrifugal tubes in the space beneath said sealing baffles.

2. The apparatus of claim 1 having a baffle extending vertically in said dust passage between said centrifugal tubes.

3. The apparatus of claim 1 in which the inclination of the inlet openings to the tubes of one vertical series is reversed to that of the next adjacent series.

4. Apparatus for separating suspended particles from gases which comprises a dust chamber having a pair of spaced, parallel, vertical walls; tubes extending from one of said walls to the opposite wall; one of said walls having groups of slots, one group for each of said tubes within the perimeter of said tube, the slots of each group extending in radial directions from a central point and the areas of said wall between said slots being inclined to provide rotatory passages into each said tube; the opposite wall having an opening for each tube and a flange about said opening extending into said tube and spaced from the wall thereof to form an annular pocket, said tube having a longitudinal slot terminating in said pocket.

5. The apparatus of claim 4 in which said longitudinal slot is tapered.

6. The apparatus of claim 4 in which the edges of said longitudinal slot are off-set.

7. The apparatus of claim 4 having a deflector within each said tube adjacent said slotted wall the periphery of said deflector being spaced from the wall of its respective tube to provide an annular passage in advance of said slot.

8. The apparatus of claim 4 having deflectors, one for each said tube, mounted on said slotted wall and extending inwardly of its respective tube to form an annular passage between the periphery of said deflector and the wall of its respective tube in advance of said slot.

9. The apparatus of claim 4 having deflectors, one for each tube, mounted on said slotted wall axially of said tube and extending into said tube to form an annular passage in advance of said slot, said tube having an inlet opening to said annular passage.

10. The apparatus of claim 4 in which said tubes are arranged in vertical rows and in which said longitudinal slots are at the sides of said tube and the edges of said slots are off-set to deliver downwardly into said dust chamber.

11. The apparatus of claim 4 in which said tubes are arranged in series of vertical rows and in which said longitudinal slots of said tubes are at the sides of said tubes and off-set to deliver downwardly and in which the longitudinal slots of adjacent rows are on opposed sides of said tubes.

12. Apparatus for separating suspended particles from gases which comprises a dust chamber having a pair of spaced, parallel, vertical walls; a series of vertical rows of tubes extending substantially horizontally from one of said walls to the opposite wall; one of said walls having groups of slots, one group for each of said tubes within the perimeter of said tube, the slots of each group extending in radial directions from a central point and the areas of said wall between said slots being inclined to provide rotatory passages into each said tube; the opposite wall having an opening for each tube and a flange about said opening extending into said tube and spaced from the wall thereof to form an annular pocket; each tube having a longitudinal slot terminating in said pocket and having its edges off-set to deliver downwardly, the longitudinal slots of the tubes of adjacent rows being opposed and chutes in said dust chamber to receive particles discharged from said longitudinal slots.

13. The apparatus of claim 12 having passages from said dust chamber to the inlet ends of said tubes.

14. A centrifugal separating tube having a wall closing one end, said wall having radial slots within the periphery of said tube the areas of said wall between said slots being inclined to provide rotatory inlet passages to said tube, a wall closing the opposite end of said tube and having an opening, a flange about said opening extending into said tube to form an annular pocket, the wall of said tube having a longitudinal slot terminating in said pocket and a deflector secured to said slotted wall centrally of said slots and extending into said tube to form a tapering annular passage in advance of said slot in the wall of said tube.

15. A centrifugal separating tube having a wall closing one end, said wall having radial slots within the periphery of said tube the areas of said wall between said slots being inclined to provide rotatory inlet passages to said tube, a wall closing the opposite end of said tube and having an opening, a flange about said opening extending into said tube to form an annular pocket, the wall of said tube having a longitudinal slot terminating in said pocket, and a deflector secured centrally of said slotted tube and extending into said tube to provide a tapering annular passage in advance of said slot in said tube, said tube having an entrance opening into said tapered passage.

16. The centrifugal separating tube of claim 14 in which said longitudinal slot is tapered.

17. The centrifugal separating tube of claim 14 in which the edges of said longitudinal slot are off-set.

CHARLES B. McBRIDE.

REFERENCES CITED

The following references are of record in the file of this patent:

UNITED STATES PATENTS

| Number | Name | Date |
|---|---|---|
| 1,757,432 | Kamrath | May 6, 1930 |
| 1,970,077 | Collins | Aug. 14, 1934 |
| 1,997,125 | Soyez | Apr. 9, 1935 |
| 2,059,521 | Hawley | Nov. 3, 1936 |
| 2,082,242 | Bowen | June 1, 1937 |
| 2,331,786 | Lincoln | Oct. 12, 1943 |
| 2,348,785 | Bullock | Mar. 16, 1944 |

FOREIGN PATENTS

| Number | Country | Date |
|---|---|---|
| 580,936 | Great Britain | Sept. 25, 1946 |